(12) United States Patent
Calvert et al.

(10) Patent No.: US 9,707,730 B1
(45) Date of Patent: Jul. 18, 2017

(54) PAPER-BASED COOKING CONTAINER PROVIDING IMPROVED PRODUCT BROWNING

(75) Inventors: Barry G. Calvert, Covington, VA (US); G. Mervin Broce, Covington, VA (US)

(73) Assignee: WestRock MWV, LLC, Norcross, GA (US)

( * ) Notice: Subject to any disclaimer, the term of this patent is extended or adjusted under 35 U.S.C. 154(b) by 1900 days.

(21) Appl. No.: 11/810,900

(22) Filed: Jun. 7, 2007

Related U.S. Application Data

(60) Provisional application No. 60/811,984, filed on Jun. 8, 2006.

(51) Int. Cl.
| | |
|---|---|
| *A47J 37/12* | (2006.01) |
| *B65D 1/42* | (2006.01) |
| *B31B 1/00* | (2006.01) |
| *B31B 49/02* | (2006.01) |
| *B31B 43/00* | (2006.01) |
| *A47J 37/04* | (2006.01) |
| *B21D 51/18* | (2006.01) |

(52) U.S. Cl.
CPC ............ *B31B 43/00* (2013.01); *A47J 37/044* (2013.01); *B21D 51/18* (2013.01)

(58) Field of Classification Search
CPC ...... A47J 37/044; A47J 37/1214; A47J 37/10; A21B 3/15; D21F 11/16; B42F 17/00; B21D 51/18; B21D 51/26; B65D 1/34; B65D 1/46; B65D 2543/00296; B31B 43/00; B31B 2201/223

USPC .......... 99/355, 422; 162/196; 220/656, 657, 220/659; 493/152
See application file for complete search history.

(56) References Cited

U.S. PATENT DOCUMENTS

| | | | | |
|---|---|---|---|---|
| 1,505,999 | A * | 8/1924 | Gereke | 229/122.32 |
| 4,337,116 | A * | 6/1982 | Foster et al. | 162/158 |
| 4,721,499 | A * | 1/1988 | Marx et al. | 493/152 |
| 4,861,958 | A * | 8/1989 | Bohrer et al. | 219/727 |
| 5,004,121 | A * | 4/1991 | Howe | 220/573.1 |
| 5,094,706 | A * | 3/1992 | Howe | 156/214 |
| 5,180,894 | A * | 1/1993 | Quick et al. | 219/730 |
| 5,338,921 | A * | 8/1994 | Maheux et al. | 219/730 |
| 6,183,128 | B1 * | 2/2001 | Beran et al. | 374/44 |
| 6,364,201 | B1 * | 4/2002 | Varano | 229/198.2 |
| 6,379,497 | B1 * | 4/2002 | Sandstrom et al. | 162/123 |
| 2004/0209023 | A1 * | 10/2004 | Swoboda et al. | 428/34.2 |

OTHER PUBLICATIONS

Parker, W. J., Jenkins, R.J., Butler, C. P., and Abbott, G. L., "A Flash Method of Determining Thermal Diffusivity, Heat Capacity, and Thermal Conductivity," Journal of Applied Physics, 32 (9), 1961 pp. 1679-1684.

\* cited by examiner

*Primary Examiner* — Quang D Thanh
*Assistant Examiner* — Hemant Mathew
(74) *Attorney, Agent, or Firm* — WestRock IP Legal

(57) ABSTRACT

A paper-based cooking container providing improved product browning is disclosed, wherein the container includes a base, a sidewall and, optionally, a rim, and wherein a portion of the base has been modified through densification of the paper-based material. The container preferably includes both densified and undensified paper-based material.

12 Claims, 8 Drawing Sheets

(a)

(b)

PAPER-BASED COOKING CONTAINER PROVIDING IMPROVED PRODUCT BROWNING

This non-provisional application relies on the filing date of provisional U.S. Application Ser. No. 60/811,984, filed on Jun. 8, 2006, having been filed within twelve (12) months thereof, which is incorporated herein by reference, and priority thereto is claimed under 35 USC §1.19(e).

BACKGROUND

The present disclosure relates to paper-based receptacles for edible foodstuffs and, more particularly, to paper-based trays, dishes and containers for the cooking of edible foodstuffs.

Metal cookware devices, including trays, dishes and forms, are frequently employed in baking and related cooking applications where rapid cooking performance is desired. Metal cookware is generally well suited for the baking of breaded and bread-based foodstuffs, such as pizza products, where one typically seeks to produce a baked or fully cooked product having a crisp and browned crust. Metal cookware may also be particularly well suited for restaurant environments where operators frequently seek to prepare made-to-order items in a rapid manner and require cookware having excellent heat transfer characteristics.

While metal cookware may have many positive attributes, it may also have substantial maintenance and storage requirements. For example, metal cookware must be washed and dried after each use. Depending on the type of foodstuff being cooked, portions or components of the foodstuff may adhere to the metallic surface or may caramelize or otherwise polymerize to produce substances that cannot be removed by conventional washing and scrubbing, i.e., become "baked on." Non-stick metal cookware may be selected to mitigate the problems associated with metal cookware. However non-stick coatings add expense and generally require more careful handling and washing to preserve their non-stick characteristics. Metal cookware must also be racked or otherwise stored when not in use. Although such cookware is frequently designed to nest for storage, over time it may accumulate dents, deformations, and other non-destructive insults which prevent the individual pieces from nesting properly, magnifying the space required for storage.

In restaurant environments, metal cookware may also contribute to certain operational risks or inefficiencies. For example, if a product is prepared and served in metal cookware, the cookware may burn a customer as the product is subdivided at the customer's table. If the product is instead transferred to an alternate container, such as a serving dish or sealable carry-out container, such risks may be reduced, but at the cost of increased labor and increased time to delivery of the order. The storage and staging of alternate containers may also increase the amount of space that must be dedicated to equipment and supplies in a restaurant operation.

It would be desirable to have an inexpensive, paper-based cooking container that may provide cooking performance and heat transfer characteristics approaching those of metal cookware, while reducing the aforementioned maintenance and storage requirements. It would additionally be desirable to have a paper-based cooking container having both enhanced heat transfer characteristics and conventional heat transfer characteristics, such that a single container may be used both as cookware and as a serving container, or optionally a portion of a closeable carry-out container, without requiring the transfer of a foodstuff from one container into another. It would also be desirable to have a paper-based cooking container that is suitable for the baking of breaded and bread-based foodstuffs such as pizza products, and that provides food release characteristics similar to those found in non-stick metal cookware.

DETAILED DESCRIPTION

Figure 1:
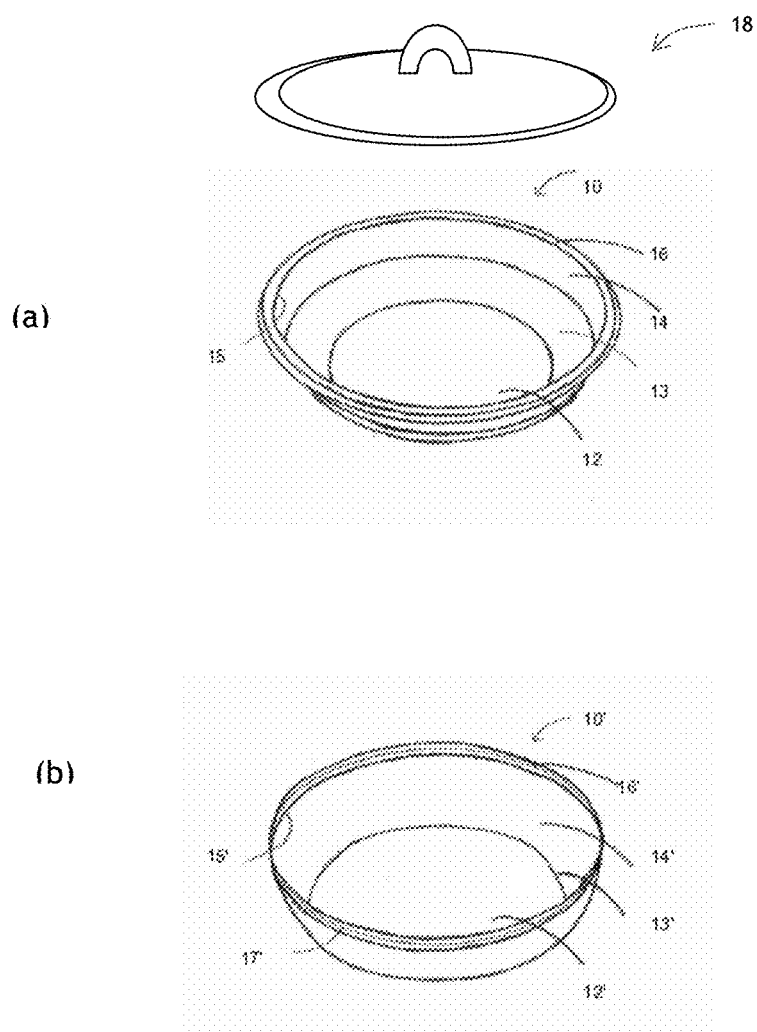
FIG. 1(a) is a perspective view of one aspect of the disclosed paper-based cooking container.
FIG. 1(b) is a perspective view of another aspect of the disclosed paper-based cooking container.
Figure 2:
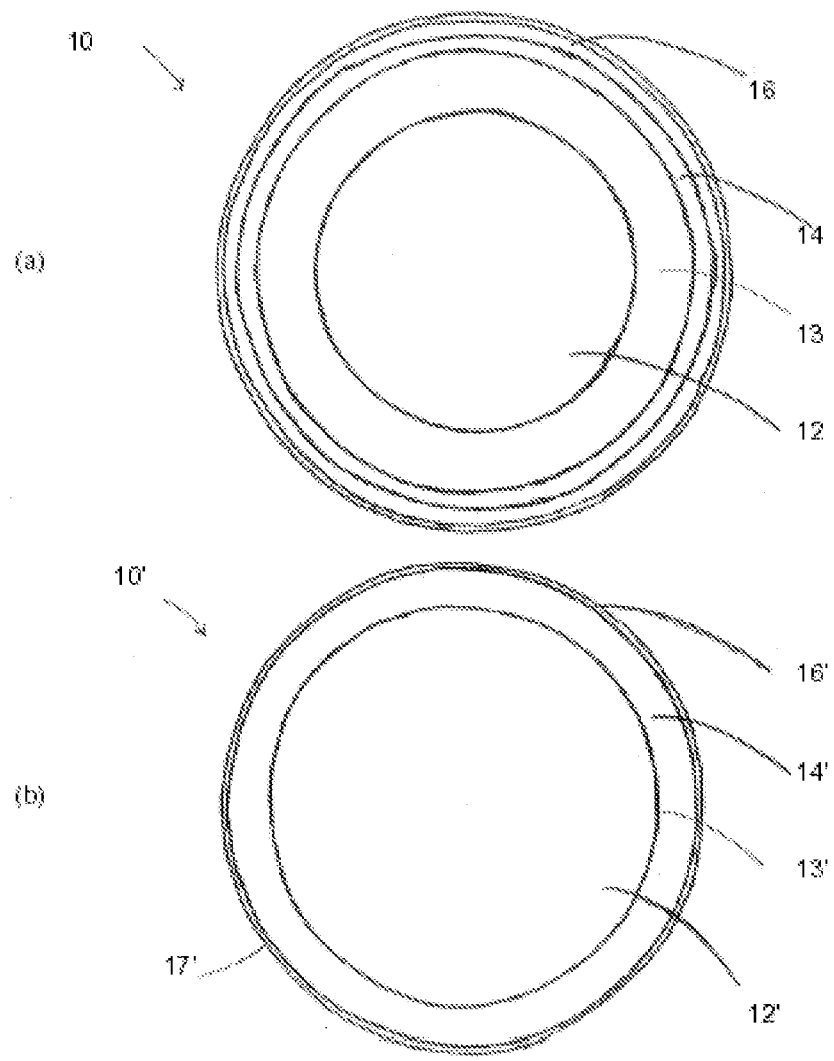
FIG. 2(a) is a top plan view of the paper-based cooking container of FIG. 1(a)
FIG. 2(b) is a top plan view of the paper-based cooking container of FIG. 1(b)
Figure 3:
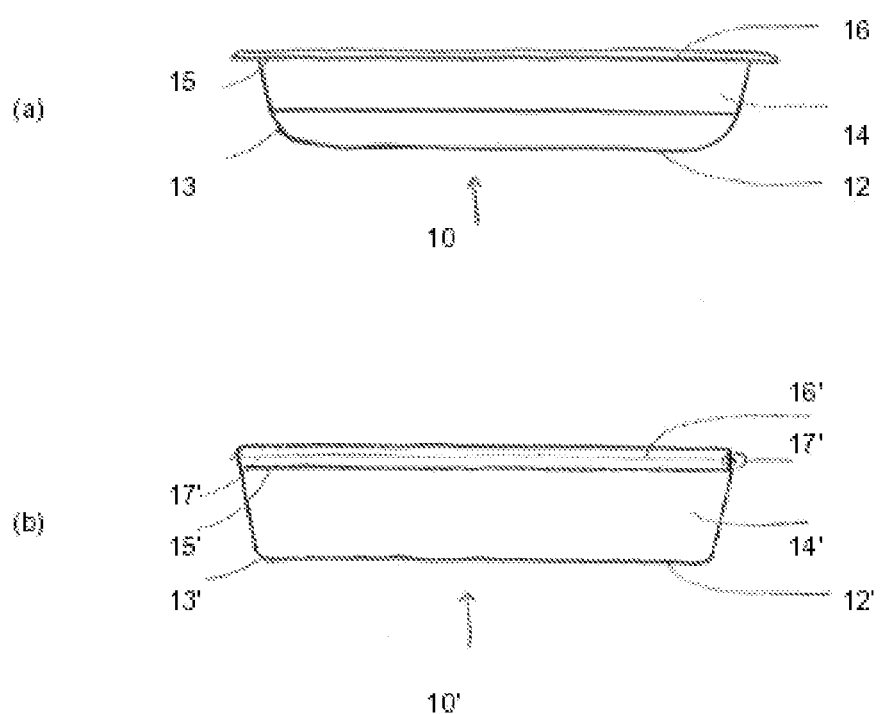
FIG. 3(a) is a side elevational view of the paper-based cooking container of FIGS. 1(a) and 2(a)
FIG. 3(b) is a side elevational view of the paper-based cooking container of FIGS. 1(b) and 2(b)

With reference to FIGS. 1(a), 2(a), and 3(a), a paper-based cooking container, generally designated as 10, may include a base 12 and an annular sidewall 14 anchored to the base 12. Optionally, the container 10 may include an annular rim 16 connected to upper edge 15 of the sidewall 14. The rim 16 may be configured as an annular lip, extending outward from the sidewall 14 to provide a means for the customer to grip and lift the container and a means for retaining a cover or lid 18. As shown in FIG. 3(a), the connection between the base 12 and the sidewall 14 may be configured as an arc or other continuous curvilinear profile 13 and may have a single or variable radius of curvature. In one aspect, the profile 13 may have a radius of curvature of about ¼" or greater.

With reference to FIGS. 1(b), 2(b), and 3(b), an alternative aspect of the paper-based cooking container, generally designated as 10', may include a base 12' and an annular sidewall 14' anchored to the base 12'. Optionally, the container 10' may include an annular rim 16' connected to upper edge 15' of the sidewall 14'. The rim 16' may be configured as a crown having a detent 17' for retaining a cover or lid. As shown in FIG. 3(b), the connection between the base 12' and the sidewall 14' may be configured as an essentially angular transition 13' between the base 12' and the sidewall 14'.

Figure 4:
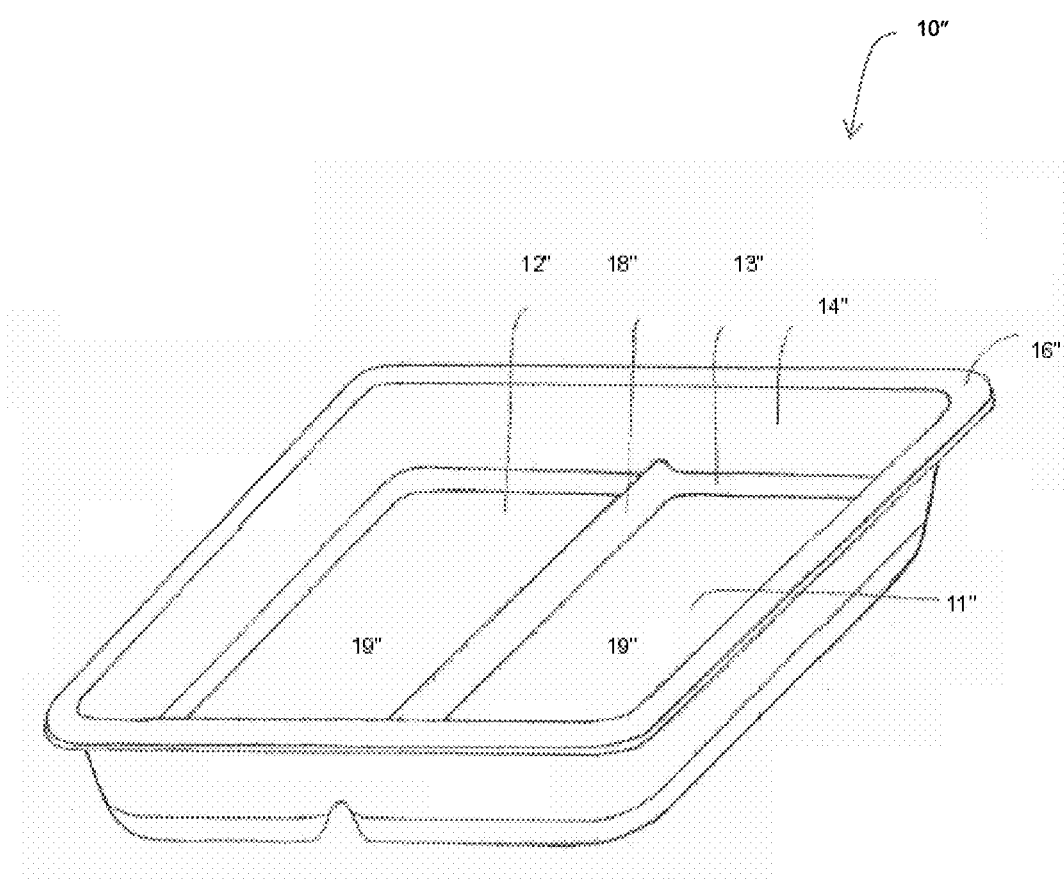
FIG. 4 is a perspective view of another aspect of a paper-based cooking container having multiple compartments.

As shown in FIG. 4, a second alternative aspect of the disclosed paper-based container, generally designated as 10", may include a rectangular or other geometrically shaped base 12", a peripheral sidewall 14" anchored to the base 12" and, optionally, a peripheral rim 16". The rim 16"

may be configured in the manners disclosed previously. The container 10" may also include internal walls 18" connected to the base 12" and extending between portions of the sidewall 14", so as to subdivide the base 12" into multiple compartments 19". The connection between the base 12" and the sidewall 14" and the internal walls 18", if any, may be configured in the manners disclosed previously.

A connection configured as a curvilinear profile, such as profile 13 in container 10, may be desired because the container base and sidewall act as conductive cooking surfaces. Use of a curvilinear profile may reduce the cooking surface contact area per unit of product volume in locations where a wall and base meet, such as transition 13' in container 10', which may prevent localized overcooking of the product's edges and promote more uniform browning of the product. Use of a curvilinear profile may also reduce the tendency of doughs to bridge across locations where a wall and base meet, which may prevent localized undercooking of the product and promote more uniform browning of the product's edges. Connections configured as a curvilinear profile or surface may be especially desired in configurations that include corners, since the cooking surface contact area per unit of product volume can be expected to approach a maximum value in proximity to such corners.

Figure 5:
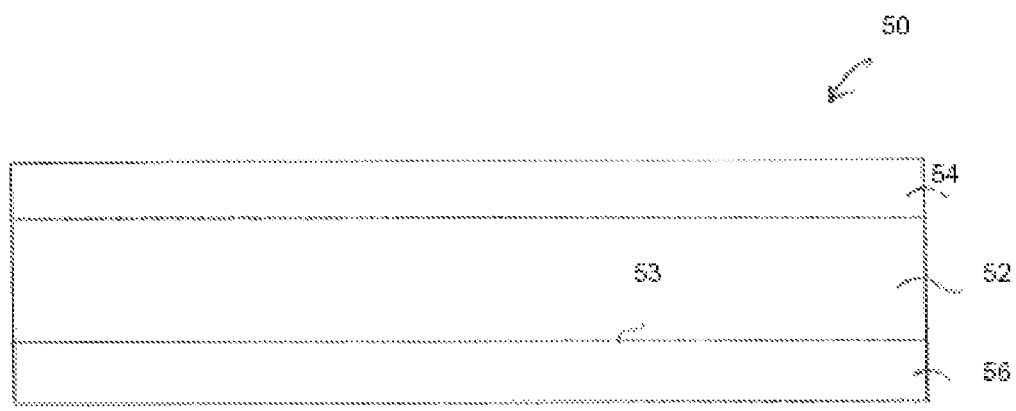
FIG. 5 is an elevational view, in section, of a portion of the base of the container of FIG. 1(a)

The containers 10, 10', 10" disclosed herein may be constructed from a substrate that is water, oil and/or heat resistant. In one aspect, as shown in FIG. 5, a substrate 50 may include a base layer 52, which may be a paperboard material having a caliper of about 0.010" to about 0.030" and a basis weight of about 100 lbs. per ream (3000 sqft.) to about 300 lbs. per ream. Optionally, a coating layer 54 may be applied to the base layer 52 and may be a high temperature thermoplastic polymer such as polyester (PET) or polymethylpentene (PMP), however the suitability of any particular coating will vary depending on the intended cooking conditions and the foodstuffs to be cooked. The coating layer 54 may also advantageously provide enhanced food release characteristics similar to those found in non-stick cookware. The coating layer 54 and the base layer 52 may be combined by various conventional techniques, such as polycoating/extrusion coating, to produce a coated paper material. Optionally, the opposing surface 53 of the base layer 52 may also be coated or finished with a third layer 56, such as a clay coating. The third layer 56 may provide a high quality surface suitable for the printing of enhanced graphics or other indicia.

Additional aspects of the container may be constructed from other paper materials such as uncoated paperboard and molded pulp. The paperboard substrate may be the aforementioned paperboard type product. A molded pulp container may be formed using various techniques known in the art and, preferably, include a base layer 52 having a thickness of about 0.010" to about 0.030". A molded pulp container may also include a coating layer 54, which may be combined with the base layer 52 using techniques known in the art, such as the vacuum thermoforming techniques disclosed in U.S. Pat. No. 4,337,116 to Foster et al., the entire content of which are incorporated herein by reference.

The substrate may be modified by densification to selectively improve the heat transfer characteristics of portions of the paper-based container and improve product browning. A mechanical press, hydraulic press or the like may be employed to selectively increase the point density of portions of the material by applying Z direction compression across the thickness of the substrate. The initial and modified point density of the selectively compressed portions may be calculated through use of the following formula:

$$\rho = W/d$$

where $\rho$ is the point density of the paper in pounds per ream per caliper point (lbs./r.c.p.), W is the basis weight of the paper, and d is the thickness of the paper in caliper points (1 caliper point=0.001"). The change in point density of the selectively compressed portions may also be calculated through use of the following formula:

$$\Delta\rho = \left(\frac{d_1}{d_2} - 1\right) \times 100\%$$

where $d_1$ is the initial thickness and $d_2$ is the compressed thickness after densification. The particular pressures and compression required to achieve heat transfer characteristics similar to those of metal cookware, such as a 0.075" thick aluminum pan, will vary depending on the composition and grade of the paper material selected for the container.

Modifying the point density of the container material through mechanical compression enhances the heat transfer characteristics of the material as measured by its thermal resistance or "R-value." In general, satisfactory changes have been observed when the point density of the material has been increased in a range of about 20 to about 35 percent, from a point density in a range of about 9 to about 11 lbs./r.c.p. to a point density in a range of about 12.5 to about 14 lbs./r.c.p., and preferably to a point density in a range of about 13 to about 14 lbs./r.c.p. For example, Table 1 summarizes the observed heat transfer characteristics of a number of relevant materials, including various coated paperboards, a densified and coated paperboard, and sample of an aluminum cooking pan. The observations were collected using the method disclosed in U.S. Pat. No. 6,183,128, the entire contents of which are incorporated herein by reference.

TABLE 1

Thermal Resistance of Paper-based Materials and Comparison to Metal

| Sample Material | Material detail ($\rho$ in units of lbs./r.c.p.) | R-value (hr-° F.-ft$^2$/BTU) |
|---|---|---|
| Corrugated paper | 3 ply, F-flute, 100 lb. basis weight per ply | 0.072 |
| Paperboard | 0.023", 240 lb. basis weight, PET coating, $\rho \approx 10.5$ | 0.050 |
| Paperboard | 0.023", 240 lb. basis weight, PMP coating, $\rho \approx 10.5$ | 0.049 |
| Paperboard | 0.019", 200 lb. basis weight, PMP coating, $\rho \approx 10.5$ | 0.037 |
| Densified paperboard | 0.019", 200 lb. basis weight, PMP coating, $d_2 = 0.0145$", $\rho \approx 14$. | 0.025 |
| Metal | 0.075" aluminum | 0.020 |

Similarly, Table 2 summarizes the observed heat transfer characteristics of a 19 caliper point (nominal) coated paperboard both before and after modification by densification. The observations were collected using a Netzsch Light Flash Apparatus, which measures a sample's thermal diffusivity in accordance with ASTM E1461 and a sample's specific heat through a comparison of the temperature increase in the sample and the temperature increase in a known standard. The general method and calculations are described in Parker, W. J., Jenkins, R. J., Butler, C. P., and Abbott, G. L., "A Flash Method of Determining Thermal Diffusivity, Heat Capacity, and Thermal Conductivity", Journal of Applied Physics, 32 (9), 1961, pp. 1679-1684, the entire contents of which are incorporated herein by reference. These measurements may be combined with measurements of the sample's thickness and bulk density to calculate the sample's thermal conductivity and thermal resistance.

TABLE 2

Thermal Resistance of Standard and Densified Paperboard Material*

| Sample Material ($\rho$ in lbs./c.p.) | Thickness @ 25° C. | Bulk density @ 25° C. | Testing Temp. (° C.) | R-value (hr-° F.-ft$^2$/BTU) |
|---|---|---|---|---|
| 0.019", 200 lb. basis weight, PMP coating, $\rho \approx 10.5$ | 0.0181" | 0.726 g/cm$^3$ | 25 | 0.0296 |
| | | | 50 | 0.0271 |
| | | | 75 | 0.0253 |
| | | | 100 | 0.0239 |
| 0.019", 200 lb. basis weight, PMP coating, $d_2 = 0.016"$, $\rho \approx 12.5$ | 0.0160" | 0.807 g/cm$^3$ | 25 | 0.0265 |
| | | | 50 | 0.0242 |
| | | | 75 | 0.0228 |
| | | | 100 | 0.0216 |

*Testing performed using a Netzsch LFA 447 Light Flash Apparatus

Figure 6:
FIG. 6 is a micrograph depicting the fiber structure of a 19 caliper point paperboard product.
Figure 7:
FIG. 7 is a micrograph depicting the fiber structure of a densified 19 caliper point paperboard product.

Modifying the point density of the container material through mechanical compression also alters the physical structure of the material. With reference to FIGS. 6 and 7, modification by densification increases fiber to fiber contact and decreases the air space enclosed within the fibrous structure, increasing bulk conductive heat transfer and decreasing the volume of trapped air. Thus, the modified container material acts more like a conductive material such as aluminum and less like a thermal insulator.

In one aspect, the container material may be modified by densification prior to the construction of the container. For example, if an uncoated or coated paperboard material is selected, that material may be manufactured or purchased as continuous rolls or large format sheets and subdivided or cut into container blanks prior to densification. The blanks may then be registered with a mechanical press, hydraulic press or the like and selectively compressed to produce a blank having both densified and undensified portions of material, the portions of densified material corresponding to those portions of the container 10, 10', 10" which are intended to have enhanced heat transfer characteristics, such as major portions of the base 12, 12', 12", portions of the sidewall 14, 14', 14" and/or transition portions 13, 13', 13". The blanks may subsequently be registered with machinery that configures the container material into a container 10, 10', 10". Densification is likely to reduce the ability of the material to maintain a rigid shape, such as a curvilinear profile 13, an angular transition 13' or a peripheral rim 16, 16'. Therefore, densification may be avoided for portions of the material that will be used to form such container features or that will comprise the structure immediately adjacent to such features. In instances where such densification is desired, the intended container design may require a reconfiguration of the features or a selection of different materials (thickness, grade, or the like) to provide sufficient rigidity.

In another aspect, the container may be modified by densification after construction of the container. Premanufactured, unmodified containers may be placed between dies loaded into a mechanical press, hydraulic press or the like, with the dies configured so that compression is selectively applied to those portions of the container which are intended to have enhanced heat transfer characteristics. Again, densification is likely to reduce the ability of the material to maintain a rigid shape, such as a curvilinear profile 13, an angular transition 13', or a peripheral rim 16, 16'. In instances where such densification is desired, the intended container design may require some alteration to provide sufficient rigidity.

Selective densification of the container material advantageously improves the heat transfer characteristics of portions of the container 10 that are intended to cook and brown food, but maintains the insulative characteristics of the unmodified material in portions of the container such as the rim 16 and base-sidewall transition 13. Such unmodified portions of the paper-based cooking container will feel cooler to the touch than a comparable metal construction, and may serve to prevent accidental burns when a product is served and subdivided at a customer's table or when a container is delivered to a customer for carry-out. Selective densification of the container may also be used to customize the heat transfer characteristics of multiple compartment containers to suit the container for various types of foods. For example, with reference to FIG. 4, the container may optionally include a densified base portion 12" and an undensified base portion 11", the former being suited for foods such as breaded and bread-based foodstuffs, and the latter being suited for foods such as meats, vegetables, and the like.

The containers 10, 10', 10" may be constructed by various techniques known in the art. For example, containers manufactured from the paperboard or coated paperboard materials discussed previously may be thermoformed to produce configurations like those shown in FIGS. 1(a), 2(a), 3(a), and 4 by introducing blanks of container material into a hydraulic thermoforming press, such as a TF Series Hydraulic Forming Press marketed by Gralex, Inc. of Lewis Center, Ohio. Additional aspects of the container may be constructed by scoring blanks of container material and introducing the scored blanks into a mechanical tray and carton former for automated container construction, by hand-folding scored blanks, or by other means of forming folded paperboard containers known in the art. Still additional aspects of the container, like that shown in FIGS. 1(b), 2(b), and 3(b), may be constructed from a molded pulp material using precision molding, free-drying or other known pulp molding techniques, optionally coated, and modified by densification after construction as discussed previously.

Figure 8:
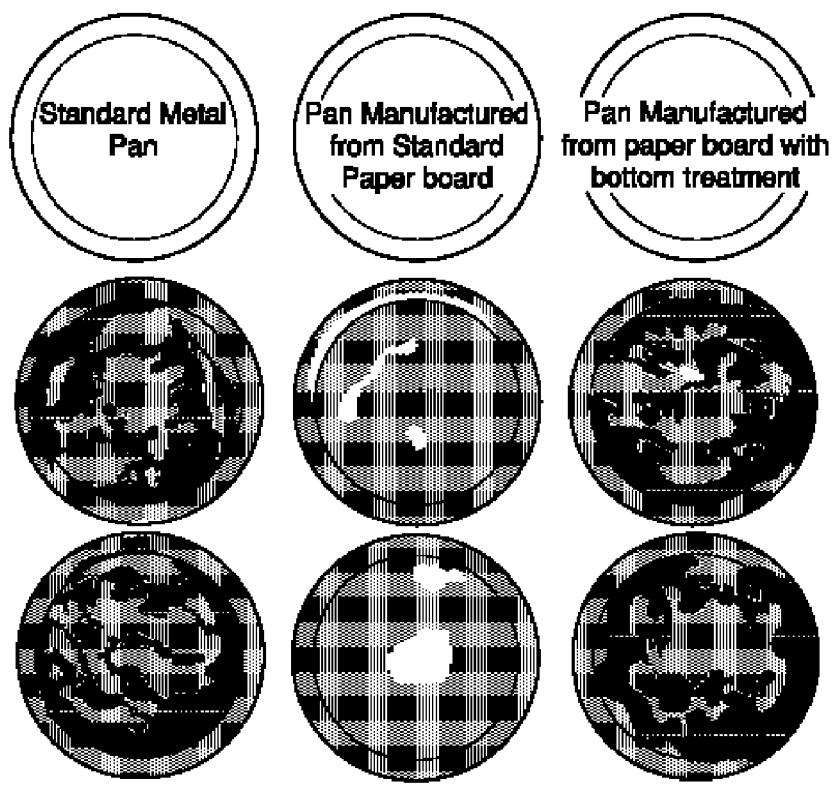
FIG. 8 is a photograph depicting the degree of browning observed in a series of pizzas cooked in metal cookware, paper-based cookware and densified paper-based cookware.

Containers constructed using densified paper-based materials such as those disclosed herein are expected to exhibit improved browning performance. For example, with reference to FIG. 8, the browning performance of an aspect of the disclosed container was evaluated by sensory testing using samples of a pizza product prepared in a commercial conveyor oven. Multiple product samples were prepared for baking in three types of pans: (1) a 0.075" coated aluminum pan; (2) a 19 caliper point 200 lb basis weight PMP-coated paperboard pan configured generally as shown in FIGS. 1(a), 2(a), and 3(a); and (3) a 19 caliper point 200 lb basis weight PMP-coated paperboard pan having a base portion compressed to 16 caliper points ($\rho \approx 12.6$) and configured generally as shown in FIGS. 1(a), 2(a), and 3(a). Each pan was coated with a quantity of oil and loaded with a ¼" to ½" thick base of proofed pizza dough that was finished with various pizza ingredients. The samples were then cooked in a commercial conveyor oven operating at between 400 and 500° F. for approximately 7 minutes. The cooked samples were subsequently inverted, separated from their pans and visually inspected to determine characteristics such as browning, cooking uniformity, defects in food release and overall appearance. The cooked samples were also qualitatively tested to determine whether there were any defects in taste (presence of any off-flavors), texture (differences in crispyness in comparison to product cooked in a metal pan)

and degree of cooking (localized undercooking or overcooking of product dough, etc.). As shown in FIG. 8, samples cooked in a paper-based container including a densified paperboard portion exhibited visual characteristics that were similar to or equivalent to the characteristics exhibited by samples cooked in a coated aluminum pan. In addition, the samples exhibited browning that was substantially improved over the browning observed in a container including a standard paperboard base that was not densified. The additional sensory testing described above did not reveal any significant defects in the cooked product. The improved product browning and crispy texture observed during sensory testing indicates that the paper-based cooking container achieved temperatures sufficient to fry and cook the product dough in a time period similar to those employed with metal-based pans. In addition, visual inspections of cross-sections of the cooked product indicated that the product dough had completely cooked. The food release characteristics of the paperboard/PMP laminate described herein were adjudged to be superior to the food release characteristics of the coated aluminum pan, especially in instances where a cheese ingredient had melted onto a cooking pan/container surface.

STATEMENT OF THE INVENTION

A paper-based cooking container providing improved product browning, wherein the container includes a base, a sidewall and, optionally, a rim, and wherein a portion of the base has been modified through densification of the paper-based material. The container includes both densified and undensified paper-based material.

A method of manufacturing a paper-based cooking container providing improved product browning, wherein a paper material is modified through densification of a portion of the material corresponding to a portion of the base of said container, and said container is subsequently thermoformed, scored and folded or otherwise manufactured from blanks of partially modified material.

A method of manufacturing a paper-based cooking container providing improved product browning, wherein a container is molded, thermoformed, scored and folded or otherwise manufactured from a paper-based material, and said container is subsequently modified through densification of a portion of the base of said container.

What is claimed is:

1. A cooking container comprising a paper-based material that includes a base and a sidewall, at least a portion of the base being densified to a point density range of about 12.5 lbs/r.c.p. to about 14 lbs/r.c.p., and at least a portion of the sidewall having a point density range of about 9 lbs/r.c.p. to about 11 lbs/r.c.p.

2. The container of claim 1 further comprising a rim.

3. The container of claim 1 wherein the container acts as both cookware and a serving container.

4. The container of claim 3 wherein the serving container also acts as a closeable carryout container.

5. The container of claim 1 wherein at least a portion of the base being densified to a point density range of about 13 lbs/r.c.p. to about 14 lbs/r.c.p.

6. The cooking container of claim 1, wherein the paper-based material is paperboard.

7. A method of manufacturing a cooking container including a base component and a sidewall component, the method comprising steps of:
   (a) providing a paper-based blank;
   (b) densifying at least a portion of the paper-based blank that is corresponded to the base component such that the densified portion of the base component has a point density range of about 12.5 lbs/r.c.p. to about 14 lbs/r.c.p. while leaving at least a portion of the paper-based blank at a point density range of about 9 lbs/r.c.p to about 11 lbs/r.c.p.; and
   (c) forming the blank obtained from step b into the container.

8. The method of claim 7 wherein the densifying step (b) is performed such that the densified portion of the base component has a point density range of about 13 lbs/r.c.p. to about 14 lbs/r.c.p.

9. The method of claim 7 wherein the densifying step (b) is performed such that the densified portion of the blank has a point density about 20% to 30% higher than a point density of a portion not being densified.

10. A method of manufacturing a cooking container including steps of:
    (a) providing a paper-based blank;
    (b) forming the paper-based blank into a container shape that comprises a base component and a sidewall component; and after said forming step
    (c) densifying at least a portion of the base component such that the densified portion has a point density range of about 12.5 lbs/r.c.p. to about 14 lbs/r.c.p.

11. The method of claim 10 wherein the densifying step (c) is performed such that the densified portion of the base component has a point density range of about 13 lbs/r.c.p. to about 14 lbs/r.c.p.

12. The method of claim 10 wherein the densifying step (c) is performed such that the densified portion of the base component has a point density about 20% to 30% higher than a point density of a portion not being densified.

* * * * *